(12) United States Patent
Hasegawa et al.

(10) Patent No.: US 7,883,748 B2
(45) Date of Patent: Feb. 8, 2011

(54) METHOD OF MAKING REINFORCING FIBER SHEET BY SCREEN PRINTING

(75) Inventors: Tomohide Hasegawa, Osaka (JP); Houtetsu Hasegawa, Osaka (JP)

(73) Assignee: Hasepro, Inc., Osaka (JP)

( * ) Notice: Subject to any disclaimer, the term of this patent is extended or adjusted under 35 U.S.C. 154(b) by 387 days.

(21) Appl. No.: 10/541,898

(22) PCT Filed: Jan. 13, 2004

(86) PCT No.: PCT/JP2004/000165

§ 371 (c)(1), (2), (4) Date: Jul. 11, 2005

(87) PCT Pub. No.: WO2004/062906

PCT Pub. Date: Jul. 29, 2004

(65) Prior Publication Data

US 2006/0124234 A1    Jun. 15, 2006

(30) Foreign Application Priority Data

Jan. 10, 2003    (JP) .............................. 2003-004723

(51) Int. Cl.
  *B05D 5/00*    (2006.01)
  *B05D 1/26*    (2006.01)
  *B05D 1/32*    (2006.01)

(52) U.S. Cl. ...................... 427/282; 427/412

(58) Field of Classification Search .............. 427/372.2, 427/282, 412

See application file for complete search history.

(56) References Cited

U.S. PATENT DOCUMENTS

| | | | |
|---|---|---|---|
| 4,037,008 A * | 7/1977 | Tugwell | 428/200 |
| 5,939,338 A * | 8/1999 | Aucagne et al. | 442/59 |
| 5,965,232 A * | 10/1999 | Vinod | 428/85 |
| 6,211,308 B1 * | 4/2001 | Saint Victor | 525/531 |

| | | |
|---|---|---|
| 2002/0006492 A1 | 1/2002 | Morikawa et al. |

FOREIGN PATENT DOCUMENTS

| | | |
|---|---|---|
| EP | 0 632 675 A1 | 1/1995 |
| EP | 1 555 302 A1 | 7/2005 |
| JP | 2-106439 | 8/1990 |
| JP | 7-329230 A | 12/1995 |
| JP | 9-85841 | 3/1997 |
| JP | 9-193291 | 7/1997 |
| JP | 11-315482 A | 11/1999 |
| JP | 11-320737 | 11/1999 |
| JP | 11-348191 | 12/1999 |
| JP | 2000-129225 A | 5/2000 |
| JP | 2000-326618 | 11/2000 |
| JP | 2001-011406 A | 1/2001 |
| JP | 2002-019309 A | 1/2002 |
| JP | 2002-105874 A | 4/2002 |

OTHER PUBLICATIONS

Definition of "textile" downloaded from http://www.m-w.com/dictionary/textile on Oct. 30, 2007.*
European Search Report dated Oct. 31, 2006, Application No. 04701672.0-2124.
Japanese Office Action dated May 26, 2009, issued in corresponding to Japanese Patent Application No. 2005-378051.

* cited by examiner

*Primary Examiner*—William Phillip Fletcher, III
(74) *Attorney, Agent, or Firm*—Birch, Stewart, Kolasch & Birch, LLP

(57) ABSTRACT

A method of manufacturing a reinforcing fiber sheet includes the following steps (a) to (c). In the first step, a screen having a mesh size which is coarser than a standard mesh size is set on top of a cloth layer constructed of vertically and horizontally woven vertical strips and horizontal strips which are assemblages of numerous reinforcing fibers. In the second step, an ink that exhibits good flexibility after drying is supplied onto the screen in a screen printing, and the cloth layer is impregnated with the ink. In the third step, the cloth layer impregnated with the ink is dried to form a cloth core. This cloth core is embedded in a matrix resin and used as a reinforcing material for a molded article, or a synthetic resin high-stretch sheet material and the resulting assembly is used as a material for dress-up sheets.

4 Claims, 6 Drawing Sheets

FIG. 2
(a)
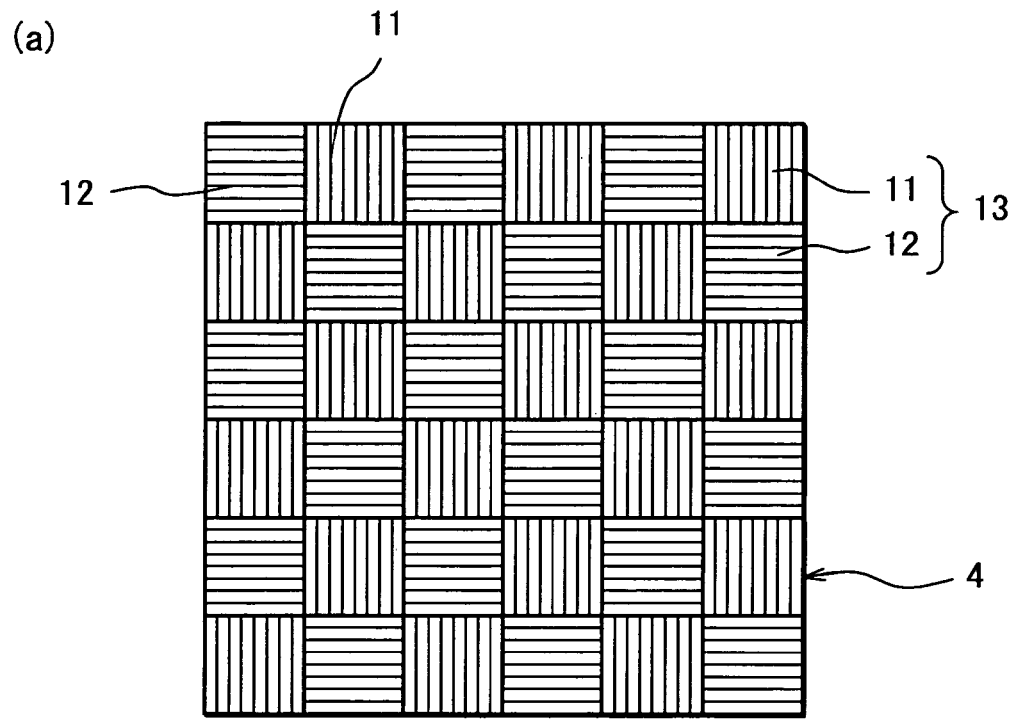
(b)
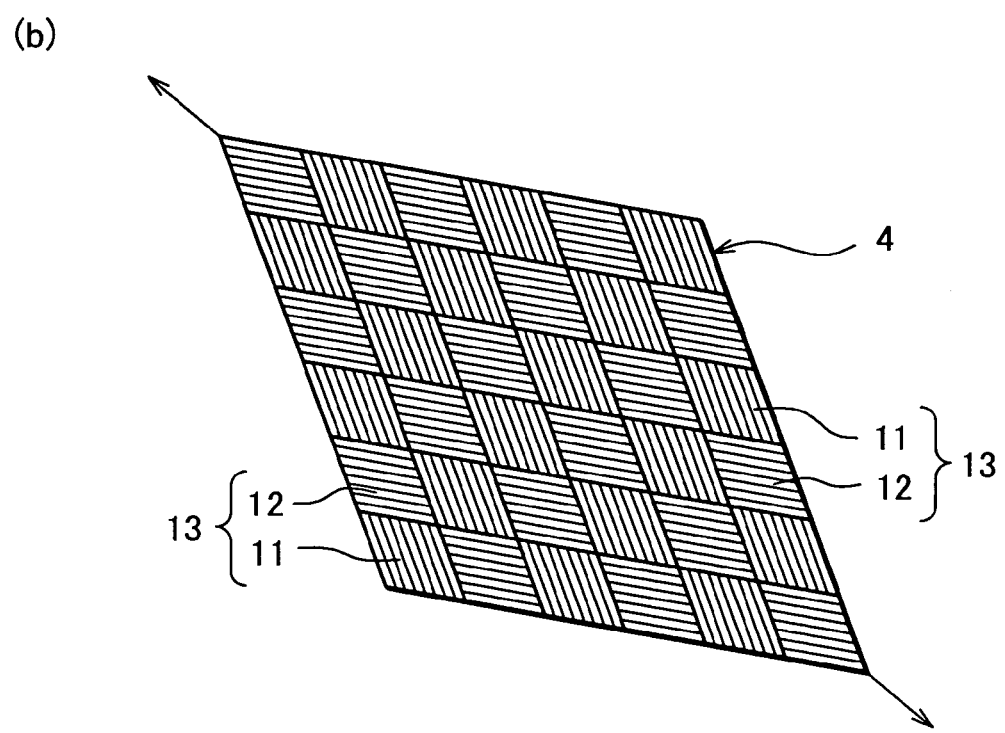

FIG. 7
(a)
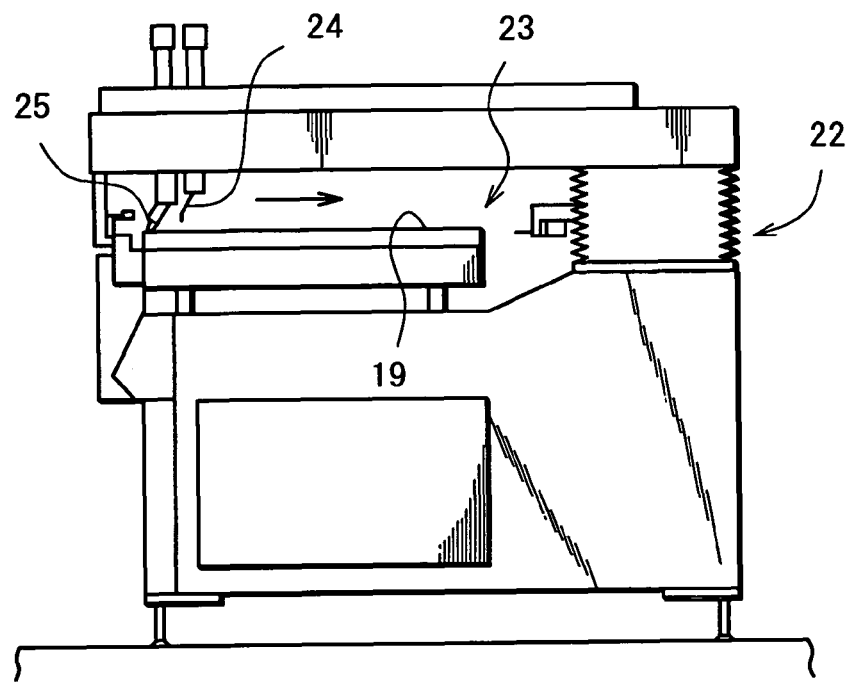
(b)
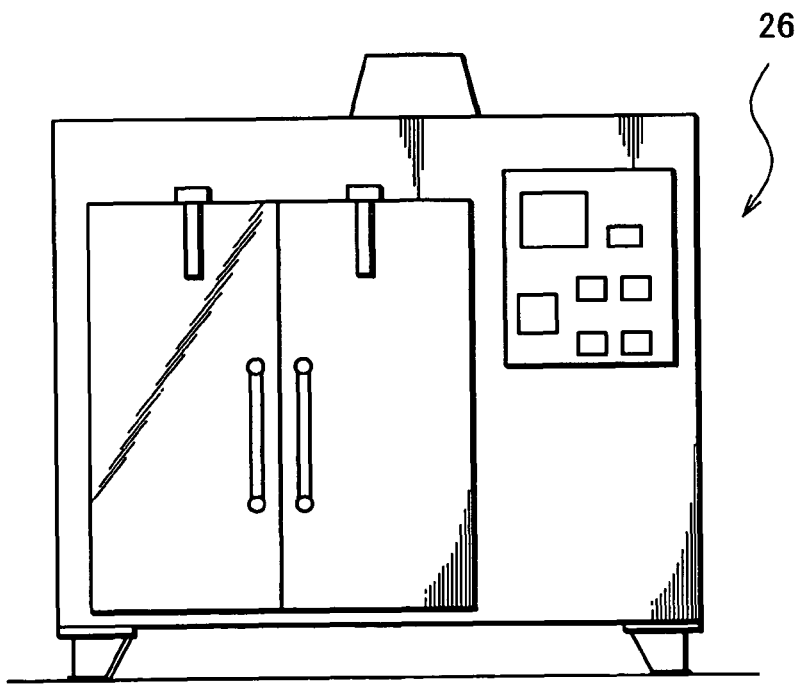

METHOD OF MAKING REINFORCING FIBER SHEET BY SCREEN PRINTING

TECHNICAL FIELD

The present invention relates to a reinforcing fiber sheet, a method of manufacture thereof, and dress-up sheets which use the reinforcing fiber sheet.

BACKGROUND ART

Recently, to achieve weight reductions and increased strength in the automotive body, carbon cloth constructed of vertically and horizontally woven vertical and horizontal strips which are assemblages of numerous carbon fibers is sometimes embedded in a matrix resin as a reinforcing material for automotive parts such as bumpers and hoods. However, because the carbon fibers making up this carbon cloth are ultrafine fibers, when immersed in the matrix resin within a mold, the carbon cloth may locally come undone and the vertical and horizontal strips may meander or twist, which sometimes compromises the appearance of the automotive part after it has been molded.

Acrylic/carbon sheets composed of such a carbon cloth set securely with an acrylic resin have thus appeared on the market. These carbon sheets harden almost completely at ordinary room temperature, but freely deform when heated to a temperature of 130 to 200° C. Hence, by heating this carbon sheet so as to deform it, placing the deformed sheet in a mold, then filling the mold interior with matrix resin after the carbon sheet re-hardens, a carbon fiber-reinforced automotive part can be cleanly molded without meandering of the vertical and horizontal strips.

However, because the acrylic/carbon sheet must be heated to deform it so that it fits into the mold, setting such a carbon sheet within a mold is very laborious and time-consuming, increasing the cost and time involved in the production of automotive parts.

Accordingly, a first object of the invention is to enable the clean and simple production of molded articles having a reinforcing fiber cloth embedded therein, and thus enhance the quality of the molded articles without increasing the production cost or time.

Automotive parts using this type of carbon cloth are often used in race-spec cars such as the F1 and so the very appearance of the reinforcing fiber weave pattern created by horizontally and vertically weaving together the vertical strips and horizontal strips has a considerable value, particularly among young people who like cars. Dress-up sheets with a simulation weave pattern printed on the surface and an adhesive layer on the back are commercially sold for this reason. These sheets are sometimes applied to the interior or exterior trim to "dress up" a car.

However, because dress-up sheets on which a weave pattern has merely been simulated by printing have a flat surface and lack the surface texture characteristic of carbon cloth, they have a cheap appearance being devoid of character. Moreover, the fact that an acrylic/carbon sheet does not deform unless heated at a high temperature makes it very difficult to use as a dress-up sheet for application to interior or exterior trim on a vehicle.

Accordingly, a second object of the invention is to make it possible to obtain dress-up sheets which include a real reinforcing fiber cloth and can be deformed with relative freedom without heating, and thus enable dress-up with a genuine weave pattern to be simply and inexpensively achieved.

DISCLOSURE OF THE INVENTION

The present invention provides the following technical means for achieving the above objects.

The reinforcing fiber sheet according to this invention is characterized by having a cloth core which includes a cloth layer constructed of vertically and horizontally woven vertical strips and horizontal strips which are assemblages of numerous reinforcing fibers, and a binding and reinforcing layer impregnated (penetrated) into the cloth layer so as to allow the cloth layer to deform at ordinary room temperature with the vertical strips and horizontal strips in a mutually bonded state.

According to this aspect of the invention, because the vertical strips and horizontal strips are in a mutually bonded state on account of the binding and reinforcing layer impregnated into the cloth layer, when the cloth core is immersed in a matrix resin, the vertical and horizontal strips do not meander or twist, enabling molded articles such as automotive parts to be cleanly molded. Moreover, because the cloth layer can be deformed at ordinary room temperature with the vertical and horizontal strips remaining in a bonded state, it is not necessary to heat the cloth core when it is shaped to the mold, thus greatly simplifying the operations involved in molding articles such as automotive parts.

When the reinforcing fiber sheet of the invention is composed solely of the above-described cloth core, it can be used as a reinforcing material for molded articles by being embedded within a matrix resin. Moreover, by applying a synthetic resin high-stretch sheet material that is transparent and has good stretch to the binding and reinforcing layer of the cloth core, the reinforcing fiber sheet can be used as a starting sheet for dress-up sheets.

In this starting sheet, a synthetic resin high-stretch sheet material that is transparent and has good stretch has been applied to the binding and reinforcing layer of the cloth core in which the cloth layer is deformable at ordinary room temperature with the vertical strips and horizontal strips remaining in a mutually bonded state. Hence, even though it includes a true reinforcing fiber cloth, this starting sheet can be relatively freely deformed without heating.

Accordingly, by providing an adhesive layer on the back side of a reinforcing fiber sheet (starting sheet for dress-up sheet) composed of a high-stretch sheet material applied to the surface of a cloth core, and applying a release sheet to the back side of this adhesive layer, there can be obtained a sticker-type dress-up sheet which is used by being applied as an add-on to the interior or exterior trim of a vehicle. Moreover, by providing a cushioning layer on the back side of this reinforcing fiber sheet, there can be obtained a covering-type dress-up sheet suitable for use as a seat covering in automobiles.

No particular limitation is imposed on the high-stretch sheet material, provided it is a material having a degree of stretch that does not hinder deformation of the cloth core. However, it is preferable to use a high-stretch sheet material composed of a synthetic resin base sheet and a binding and reinforcing layer which is formed on a back side of the base sheet by impregnating the base sheet with an ink that exhibits good flexibility after drying.

Because the binding and reinforcing layer of the high-stretch sheet material is formed on the back side of a base sheet, the back side of the binding and reinforcing layer of the high-stretch sheet material is covered by the cloth core. Hence, the binding and reinforcing layer solvent components that were impregnated into the base sheet are sealed in at the time of production, preventing them from escaping to the exterior. As a result, even after such a dress-up sheet in which a high-stretch sheet material was applied has been shipped, the ink applied to the base sheet retains for a long time the flexibility it had at the time of production, making it possible to extend the product life of the dress-up sheet.

A reinforcing fiber sheet composed only of the above-described cloth core which has a binding and reinforcing layer that enables the cloth layer to deform at ordinary room temperature while maintaining the bonded state between the vertical strips and horizontal strips can be produced by, for example, screen-printing onto a commercial reinforcing fiber cloth (cloth layer).

That is, the method of manufacturing a reinforcing fiber sheet (cloth core) according to the invention includes the following steps (a) to (c):

(a) a first step in which a screen having a mesh size which is coarser than a standard mesh size is set on top of a cloth layer constructed of vertically and horizontally woven vertical strips and horizontal strips which are assemblages of numerous reinforcing fibers;
(b) a second step in which an ink that exhibits good flexibility after drying is supplied onto the screen and screen printing is carried out, thereby impregnating the cloth layer with the ink; and
(c) a third step in which the cloth layer impregnated with the ink is dried, forming a cloth core.

By carrying out screen printing with a mesh that is coarser than normal onto a cloth layer composed of vertical strips and horizontal strips, the amount of ink applied to the cloth layer becomes very large and the ink fully impregnates the reinforcing fibers making up the cloth layer. As a result, after drying, the ink serves as an adhesive medium which bonds the vertical strips and the horizontal strips to each other, and the flexibility of the ink confers a deformability that allows the cloth layer to fully deform even at ordinary room temperature.

In the foregoing method of manufacturing a reinforcing fiber sheet, it is preferable to set the screen used for screen printing to a mesh size having a coarseness which is not more than 1/3 and not less than 1/4 of the standard mesh size (this is, the screen mesh size set by the ink manufacturer for each ink to obtain the best printing results).

At a mesh size for the screen of more than 1/3 the standard mesh size, the ink content relative to the cloth layer is inadequate, weakening the bond strength between the vertical strips and the horizontal strips, and thus making the cloth layer more likely to come undone. On the other hand, at a mesh size of less than 1/4 of the standard mesh size, the ink content relative to the cloth layer is too high, as a result of which the bundles of reinforcing fibers swell, which may cause the vertical strips and the horizontal strips to be of an uneven thickness.

Relatively good results are obtained even when the cycle of coating ink onto the cloth layer and drying the coated ink is carried out only once, although carrying this cycle out two or more times (two times is especially preferred) enables all the reinforcing fibers making up the cloth layer to be impregnated with the ink.

BRIEF DESCRIPTION OF THE DRAWINGS

FIG. 2 is a set of partial, enlarged plan views of the cloth core, with FIG. 2(a) showing the normal state before deformation and FIG. 2(b) showing the deformed state after pulling in a diagonal direction;

FIG. 7(a) is a side view of an example of a screen-printing press, and FIG. 7(b) is a front view of an example of a heating apparatus.

BEST MODE FOR CARRYING OUT THE INVENTION

Embodiments of the invention are described below in conjunction with the attached diagrams.

Figure 4:
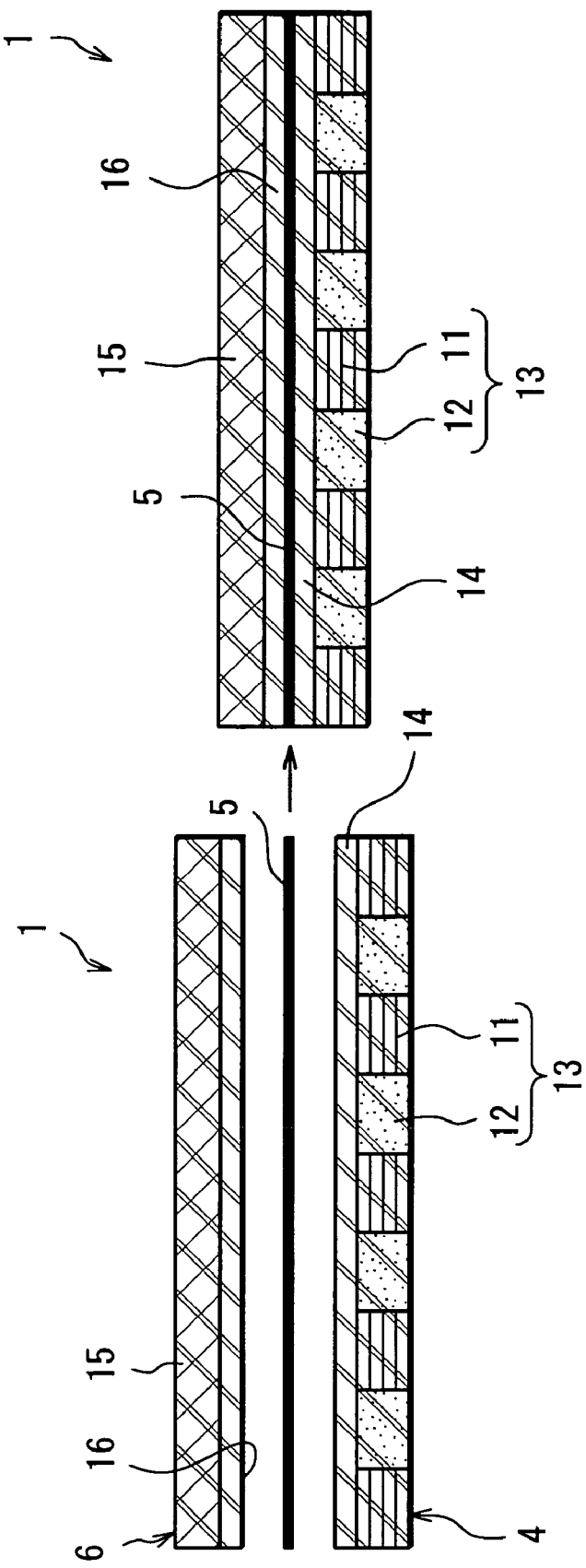
FIG. 4 is a cross-sectional view which schematically shows the internal structure of the reinforcing fiber sheet.
Figure 5:
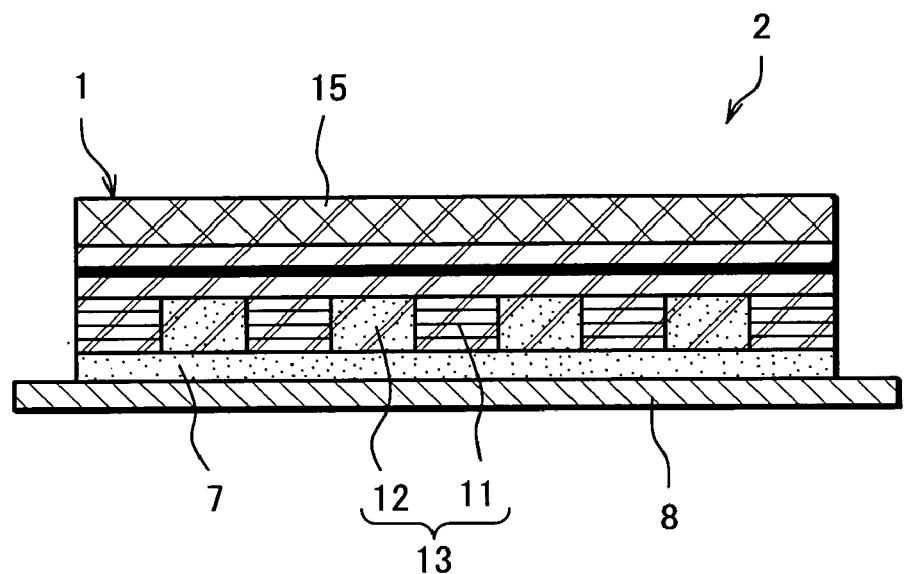
FIG. 5 is a cross-sectional view which schematically shows the internal structure of a sticker (dress-up sheet)
Figure 6:
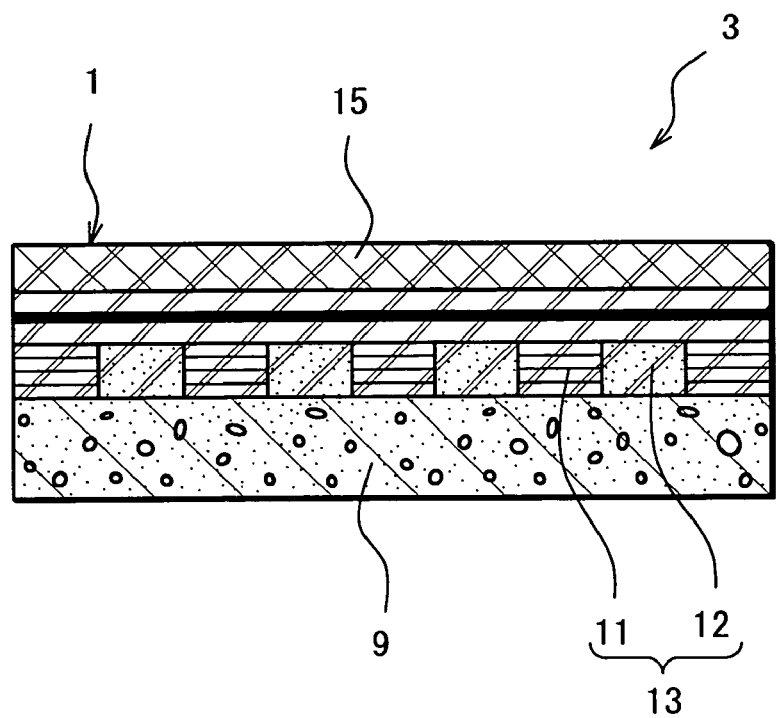
FIG. 6 is a cross-sectional view which schematically shows the internal structure of a covering (dress-up sheet)

FIG. 4 shows an embodiment of a reinforcing fiber sheet 1 according to the invention, and FIGS. 5 and 6 show embodiments of dress-up sheets 2 and 3 obtained using such a reinforcing fiber sheet 1.

Referring to FIG. 4, the reinforcing fiber sheet 1 according to the present embodiment is composed of a cloth core 4 which is made largely of reinforcing fibers such as carbon fibers, and a synthetic resin high-stretch sheet material 6 which is transparent, has a good stretch, and has been firmly applied to the surface of the cloth core 4 (top side in FIG. 4) with an intervening permanent bonding layer 5 that has a high tack.

As shown in FIG. 5, in the reinforcing fiber sheet 1 having a high-stretch sheet material 6 on the surface according to the present embodiment, if the back side of the cloth core 4 situated on the back side of the reinforcing fiber sheet 1 is coated with a tacky adhesive layer 7 and a release sheet 8 is applied to the back side of this adhesive layer 7, the reinforcing fiber sheet 1 can be employed as stickers 2 applied as add-ons to the interior or exterior trim of an automobile.

Moreover, as shown in FIG. 6, the reinforcing fiber sheet 1 of the present embodiment can be used as a seat covering 3 in automobiles by using a bonding means such as adhesive or sewing (not shown) to provide, on the back face of the cloth core 4 positioned on the back side of the sheet 1, a cushioning layer 9 made of a material such as a foamed resin.

As shown in FIG. 4, the cloth core 4 which is a constituent member of the reinforcing fiber sheet 1 is composed of a cloth layer 13 constructed of vertically and horizontally woven vertical strips 11 and horizontal strips 12 which are assemblages of numerous reinforcing fibers, and a binding and reinforcing layer 14 impregnated into the cloth layer 12 so as to enable the cloth layer 13 to deform at ordinary room temperature with the vertical strips 11 and horizontal strips 12 remaining in a mutually bonded state. The binding and reinforcing layer 14 in the illustrated embodiment is shown with the binder impregnating the entire thickness of the cloth layer 13, and additionally extending up onto the surface side of the cloth layer 13. Of course, in an actual binding and reinforcing layer 14, the degree to which the layer extends up onto the surface side may be too small to indicate or may not be noticeable.

The cloth layer 13 according to this embodiment is made of a carbon cloth constructed by plain weaving vertical strips 11 and horizontal strips 12 composed of bundles of fine carbon fibers in such a way that, when the cloth is pulled diagonally as shown in FIG. 2(b), the vertical strips 11 and horizontal strips 12 readily come undone.

This carbon cloth is commercially sold as a reinforcing material for plastic molded articles such as automotive parts, and is exemplified by Torayca Cloth produced by Toray Industries, Inc.

The binder used to form the binding and reinforcing layer 14 of the cloth core 4 is an ink that exhibits good flexibility after drying and, by impregnating the carbon fibers making up the cloth layer 13, has an adhesive function which maintains the vertical strips 11 and the horizontal strips 12 in a mutually bonded state. As a result, the vertical strips 11 and horizontal strips 12 do not meander or twist, and the cloth layer 13 is prevented from coming undone. Examples of binders having such an adhesive function include Sericol SP2100AU Clear (also known as Sericol VKT Ink Overcoat Clear for Screen Printing) and Sericol EG Screen Ink (also known as Gloss Ink for Polyester), both manufactured by Teikoku Printing Inks Mfg. Co., Ltd.

Incidentally, because the vertical strips 11 and horizontal strips 12 making up the cloth layer 13 are composed of bundles of ultrafine carbon fibers, the cloth layer 13 has the inherent quality of readily absorbing moisture. Therefore, when the reinforcing fiber sheet 1 is used as the subsequently described sticker 2, rainwater may infiltrate from the edge of the sticker 2 and cause the sticker 2 to swell. To make the cloth layer 13 water repellent and thus prevent deterioration due to swelling of the product, the ink used as the binder is preferably a solvent-type oil-based ink, and even more preferably an oil-based ink in which a water-repellent silicone has been mixed.

The high-stretch sheet material 6 is composed of a base sheet 15 made of synthetic resin and a binding and reinforcing layer 16 in which a binder impregnates in the manner of a solvent through part of the thickness region on the back side (bottom side in FIG. 4) of this base sheet 15 or through the entire thickness. The binding and reinforcing layer 16 in the illustrated embodiment is shown in a state where the binder penetrates through the entire thickness of the base sheet 15 and also extends up onto the back side of the base sheet 15.

Hence, in the reinforcing fiber sheet 1 of this embodiment, because the binding and reinforcing layer 16 of the high-stretch sheet material 6 is formed on the back side of the base sheet 15, if the high-stretch sheet material 6 is applied to the surface of the cloth core 4 with an intervening permanent bonding layer 5, the back side of the binding and reinforcing layer 16 of the high-stretch sheet material 6 becomes covered by the cloth core 4.

Hence, the solvent components of the binding and reinforcing layer 16 that was impregnated into the base sheet 15 are sealed at the time of production, preventing their release to the exterior. As a result, even after the above-described dress-up sheets 2 and 3 in which a high-stretch sheet material 6 has been applied are shipped out, the ink coated onto the base sheet 15 retains for a long time its flexibility at the time of production, making it possible to increase the product life of dress-up sheets 2 and 3.

The base sheet 15 according to the present embodiment is the substrate sheet portion of a marking film (that is, the sheet portion of a marking film from which the adhesive on the back side has been removed). Such marking films are commercially sold as film products which by themselves have excellent properties, including stretch and tensile strength. Marking films having a substrate sheet portion that can be used in the invention include those manufactured by Lintec Corporation under the trade names MODECAL, FUJIPAINT and EASYTACK, those manufactured by the same company under the trade names LUMILUSTRE and HANSHA SHEET, those manufactured by Sekisui Chemical Co., Ltd under the trade name TACK PAINT, and those manufactured by Toyo Ink Manufacturing Co., Ltd. under the trade name DYNACAL.

Specifications for some of these marking films are described below: MODECAL with a thickness of 75 to 85 μm has an elongation of over 100% and a tensile strength of 1.0 kg/10 mm. As for its heat resistance, it remains unaffected even after 168 hours at 80° C. FUJIPAINT with a thickness of 130 μm (of which the substrate portion has a thickness of 50 μm) has an elongation of over 60% in both the machine and transverse directions and a tensile strength of at least 2.0 kg in both the machine and transverse directions. Moreover, FUJIPAINT has a heat resistance such that it remains unaffected even after 240 hours at 70° C.

EASYTACK with a thickness of 135 μm (of which the substrate portion has a thickness of 50 μm) has an elongation of over 60% in both the machine and transverse directions and a tensile strength of at least 2.0 kg in both the machine and transverse directions. In addition, it has a heat resistance such that it remains normal even after 240 hours at 70° C.

Accordingly, when commercial marking film is used alone on a curved surface having a relatively gradual radius of curvature, such as the body of an automobile, the film is able to flexibly follow the surface when applied. However, we have found from tests that when the marking film is used by itself, such curvature is the limit to the range of using the marking film without heat application.

The binder used to form the binding and reinforcing layer 16 of high-stretch sheet material 6 is made of an ink that exhibits good flexibility after drying. A kind of ink having a good affinity to the base sheet 15 which is a sheet of synthetic resin such as vinyl chloride is employed. This binder impregnates the base sheet 15, giving rise to a solvent-like bonded state. As a result, the stretch and tensile strength of the base sheet 15 can be dramatically increased.

Binders that increase elongation when impregnated in the base sheet 15 as described above include, when the base sheet 15 is a polyvinyl chloride-based material, inks such as SERICOL SP2100AU Clear (also known as SERICOL VKT Ink Overcoat Clear for Screen Printing) manufactured by Teikoku Printing Inks Mfg. Co., Ltd.

Other inks that may be used include SERICOL EG Screen Ink (also known as Gloss Ink for Polyester) manufactured by Teikoku Printing Inks Mfg. Co., Ltd., and those manufactured by Seiko Advance, Ltd. under the trade name designation SG700 Series.

Specifications for SERICOL SP2100AU Clear are an elongation of 180% at a pull rate of 200 mm/min and a tensile strength of 2.0 kg/15 mm. Moreover, it has a heat resistance such that it remains normal even after 168 hours at 80° C.

Therefore, even when a binding and reinforcing layer 16 consisting of a base sheet 15 impregnated with the above-described binder is applied onto small objects having rounded areas with a small radius of curvature, such as cell phones and computer mice, it has a high enough stretch ("high stretch" refers herein to excellent elongation without accompanying defects such as fissuring) to enable a simple and clean finish to be achieved.

Moreover, although not shown, the binding and reinforcing layer 16 of the high-stretch sheet material 6 may be provided on the back side thereof with a coating layer composed of a transparent ink or a clear ink of the same material as this reinforcing layer 16.

Also, it is preferable to use an organic solvent-based acrylic pressure-sensitive adhesive as an adhesive making up the adhesive layer 7 shown in FIG. 5 because it has a "pack"

function that prevents release of the solvent component from the back side of the cloth core 4.

Figure 1:
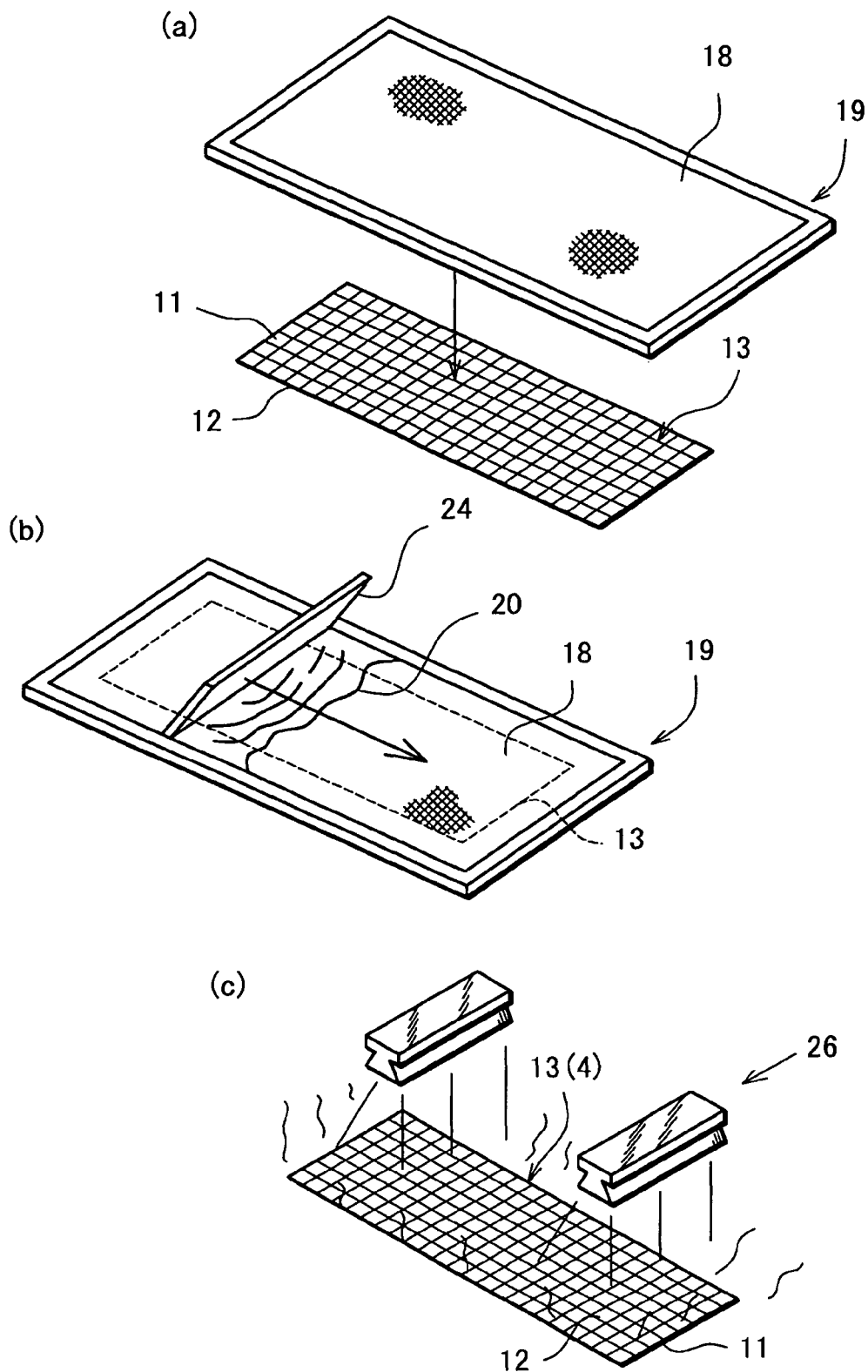
FIG. 1 is a series of perspective views illustrating steps in the production of the cloth core.
Figure 3:
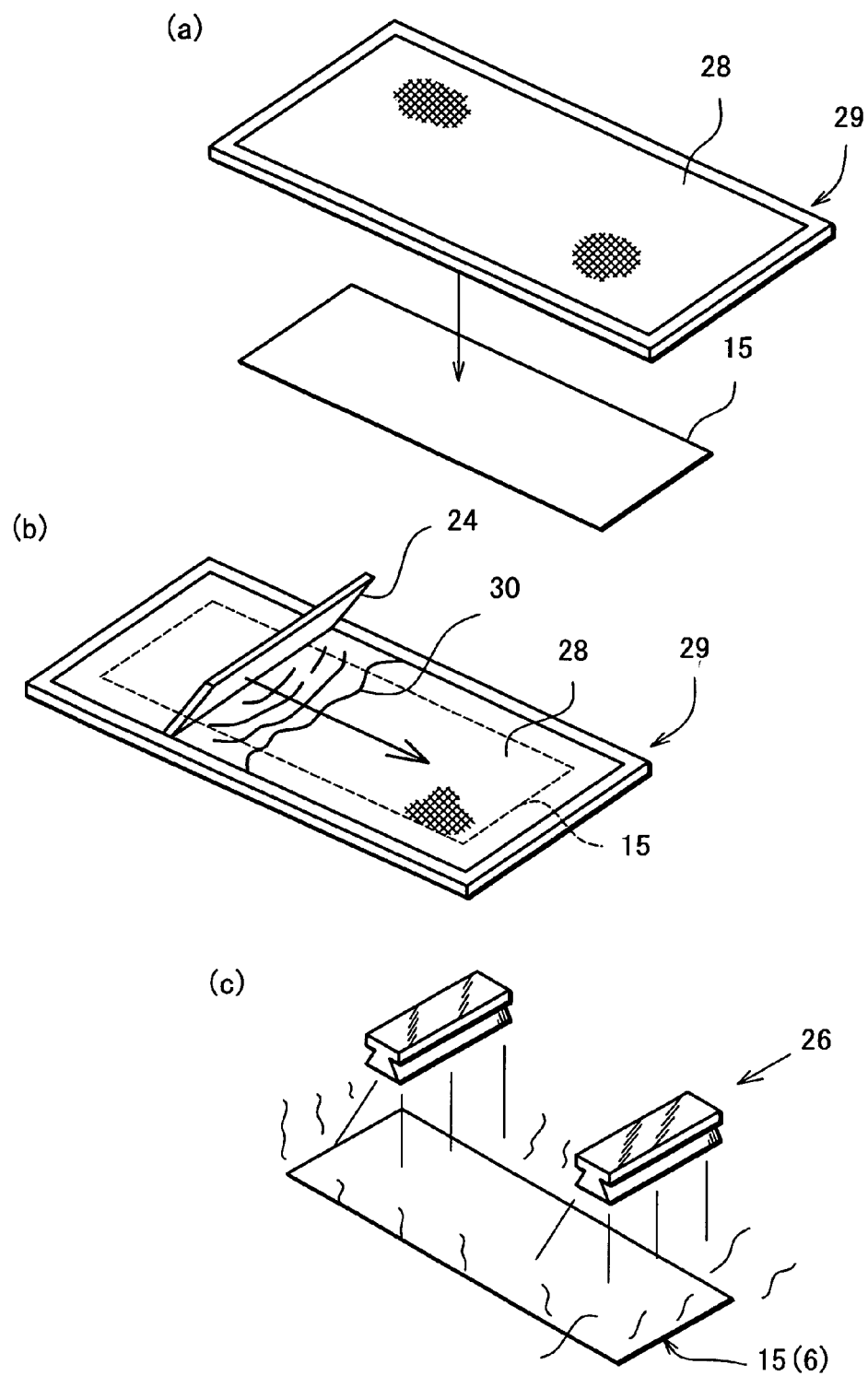
FIG. 3 is a series of perspective views illustrating steps in the production of the high-strength sheet material.

Next, a method of manufacturing the reinforcing fiber sheet 1 according to the present embodiment is described while referring to FIGS. 1 to 3.

FIG. 1 shows a method of manufacturing the cloth core 4 which is a major component of the reinforcing fiber sheet 1.

To produce such a cloth core 4, first, as shown in FIG. 1(*a*), a press plate 19 having a screen 18 is set on the top side of the above-described cloth layer 13. As shown in FIG. 1(*b*), an ink 20 that exhibits good flexibility after drying is supplied onto the screen 18 and screen printing is carried out, thereby impregnating the ink 20 into the cloth layer 13. The press plate 19 used in this screen printing operation has a screen 18 with a coarser mesh size than that specified for standard use of this ink 20.

For example, a mesh size of about 180 to 225 is regarded as appropriate in the case of the above-mentioned Sericol SP2100AU Clear, and a mesh size of about 230 is regarded as appropriate in the case of Sericol EG Screen Ink. In the present embodiment, the screen 18 of the press plate 19 is set at about 70 mesh, which is not more than ⅓ of these standard mesh sizes. By using a screen 18 having coarse mesh openings in this way, a relatively large amount of ink 20 is supplied onto the cloth layer 13, thus ensuring that a sufficient amount of ink 20 impregnates every fiber of the cloth layer 13.

Accordingly, the cloth layer 13 in which ink 20 has been fully impregnated in the manner described above, owing to the adhesive function of the ink 20 after it has dried, enters into a state in which the vertical strips 11 and horizontal strips 12 are bonded to each other as shown in FIG. 2(*a*). Moreover, because this ink 20 has good flexibility after drying, when the cloth core 4 is pulled in a diagonal direction at ordinary room temperature, the vertical strips 11 and horizontal strips 12 become inclined to each other, forming a diamond-like shape as shown in FIG. 2(*b*), but the strips remain in a bonded state, preventing the cloth layer 13 from coming undone.

The screen 18 used in this screen printing is preferably set to a coarse mesh size which is at least ¼ but not more than ⅓ the standard mesh size set by the ink maker. If the screen 18 has a mesh size which exceeds ⅓ the standard mesh size, penetration of the ink into the cloth layer 13 will be insufficient, weakening the bond strength between the vertical strips 11 and horizontal strips 12 and making the cloth layer 13 more likely to come undone.

Conversely, if the screen 18 has a mesh size which is less than ¼ of the standard mesh size, the content of ink relative to the cloth layer 13 becomes too large, causing the bundles of reinforcing fibers to swell, which may result in non-uniform thickness of vertical strips 11 and horizontal strips 12.

FIG. 7(*a*) shows an example of a screen printing machine 22 used in this screen printing operation. This printing machine 22 has at the center thereof an area 23 where the press plate 19 is set, and is built so that a doctor 24 and a squeegee 25 travel across the top of the setting area 23. The press plate 19 has a screen 18 made of Tetoron.

After the ink 20 has been applied, curing is carried out for a predetermined length of time and drying of the ink 20 is awaited. It is desirable for this drying to be effected by administering heat in the manner shown in FIG. 1(*c*) using a suitable heating apparatus 26.

FIG. 7(*b*) is an external view of an example of such a heating apparatus 26. This apparatus 26 contains a hot air circulation-type constant-temperature tank (not shown). Of course, other heating techniques may also be used. The heating temperature in this case is preferably set to at least 30° C. but not more than 80° C. At less than 30° C., the ink 20 may not dry, whereas at more than 80° C. the solvent component is rapidly released, which may cause waviness.

After the ink 20 has dried, the cloth layer 13 impregnated with this ink 20 is set once again in the screen printing machine 22 and the same ink 20 having good flexibility after drying is again applied under the same conditions as described above, following which this ink 20 is again dried under the same conditions as described above using the heating apparatus 26.

By carrying out in this way at least two cycles, each consisting of the application and drying of the same ink 20 having excellent flexibility, impregnation of the ink 20 into the cloth layer 13 is more reliably achieved and the flexibility of the cloth core 4 after drying of the ink 20 can be enhanced. In cases where the cycle consisting of coating the ink 20 onto the cloth layer 13 and drying is carried out twice, it is preferable for one cycle to be carried out on the surface side and one cycle to be carried out on the back side; the resulting impregnation of the ink 20 into the cloth layer 13 will be more certain than if the ink 20 is repeatedly applied from either the surface side or the back side alone.

Next, FIG. 3 depicts a method of manufacturing the high-stretch sheet material 6 which is a constituent member of the reinforcing fiber sheet 1.

To produce the sheet material 6, first, as shown in FIG. 3(*a*), a press plate 29 having a screen 28 is set on the top side of a base sheet 15. As shown in FIG. 3(*b*), an ink 30 that exhibits good flexibility after drying is supplied onto the screen 28 and screen printing is carried out, thereby impregnating the base sheet 15 with the ink 30. The press plate 29 used in this screen printing operation has a screen 28 with a coarser mesh size than that specified for standard use of this ink 30.

For example, a mesh size of about 180 to 225 is regarded as appropriate in the case of the above-mentioned Sericol SP2100AU Clear, and a mesh size of about 230 is regarded as appropriate in the case of Sericol EG Screen Ink. In the present embodiment, the screen 28 of the press plate 29 is set at about 120 mesh, which is close to ½ of these standard mesh sizes. By using a screen 28 having coarse mesh openings in this way, a relatively large amount of ink 30 is supplied onto the base sheet 15, thus ensuring that the base sheet 15 is impregnated with a sufficient amount of the ink 30.

After this ink 30 has been applied, curing is carried out for a predetermined length of time and drying of the ink 30 is awaited. It is desirable for this drying to be effected by administering heat in the manner shown in FIG. 3(*c*) using a suitable heating apparatus 26. The heating temperature in this case is preferably set to at least 30° C. but not more than 80° C. At less than 30° C., the flexibility of the ink 30 cannot be fully achieved, whereas at more than 80° C. waviness may arise in the sheet material 1 after manufacturing.

Even within the above-indicated range of 30 to 80° C., at less than 50° C., the drying time tends to become long, whereas at more than 70° C., small defects occasionally arise on the sheet material 1. Therefore, a temperature range of 50 to 70° C. is more desirable in practice. Heating is most preferably carried out at a temperature of 60° C. for a period of 15 minutes.

Of course, in the above-mentioned specific examples of the marking film base sheet 15 and the ink 30, all are heat resistant to 70° C., and some to 80° C. Therefore, it is not particularly difficult to avoid deterioration of the base sheet 15 and ink 30 by heat, directly due to heating itself during drying.

After the ink 30 has dried, the base sheet 15 impregnated with this ink 30 is set once again in the screen printing machine 22 and the same ink 30 having good flexibility after drying is again applied under the same conditions as described above, following which this ink 30 is again dried under the same conditions as described above using the heating apparatus 26.

By carrying out in this way at least two cycles, each consisting of the application and drying of the same ink 30 having excellent flexibility, impregnation of the base sheet 15 with the ink 30 is more assured and an ample amount of application can be reliably achieved. Accordingly, there can be obtained a sheet material 6 having an even better stretch.

However, it is not always the case that the more times the cycle of application of the ink 30 to the base sheet 15 and drying the ink 30 applied thereto, the better effects can be obtained. The effects are not remarkably increased after the cycle is repeated more than two times. Hence, it is most effective to repeat the cycle of application and drying of the ink 30 two times.

The high-stretch sheet material 6 manufactured in the manner described above is integrally bonded to the surface of the above-described cloth core 4 by an intervening permanent adhesive layer 5 as shown in FIG. 4, thereby giving a reinforcing fiber sheet 1 for use as a starting sheet in, for example, the dress-up sheets 2 and 3 shown in FIGS. 5 and 6.

In addition, the above-described cloth core 4 can be embedded within a matrix resin and thereby used as the reinforcing material in a molded article. In such a case, there is no need to apply the high-stretch sheet material 6; the cloth core 4 by itself serves as the reinforcing fiber sheet 1.

The present invention is not limited to the embodiments described above.

For example, suitable fibers other than carbon fibers, such as glass fibers or Kevlar fibers, may be used as the reinforcing fibers making up the cloth layer 13. Moreover, this cloth layer 13 need not necessarily be one obtained by plain weaving the vertical strips 11 and horizontal strips 12. Use can instead be made of a cloth layer 13 obtained by twill weaving these strips.

The sticker 2 shown in FIG. 5 can be used not only on external or internal trim in vehicles, but may be applied to all sorts of objects, including electronic devices such as notebook computers and household articles such as decorative items.

As explained above, the present invention enables molded articles in which a reinforcing fiber cloth has been embedded to be neatly and simply produced, thus making it possible to improve the quality of the molded articles without increasing the cost of production and the production time.

This invention also makes it possible to obtain dress-up sheets which have a genuine reinforcing fiber cloth and freely deform without heating, thus enabling dress up with a genuine woven pattern to be easily and inexpensively achieved.

INDUSTRIAL APPLICABILITY

The reinforcing fiber sheets according to the invention can be embedded within a matrix resin and thereby employed as a reinforcing material in molded articles. Moreover, they can be employed as stickers applied to internal trim or external trim in vehicles, or as a seat covering in automobiles.

The invention claimed is:

1. A method of manufacturing a reinforcing fiber sheet having a cloth core comprising:
   (a) setting a screen on top of a cloth layer of an assemblage of reinforcing fibers constructed of vertically and horizontally woven vertical strips and horizontal strips;
   (b) supplying onto the screen an ink that exhibits flexibility after drying and screen printing to impregnate the cloth layer with the ink; and
   (c) drying the cloth layer impregnated with the ink such that the dried ink forms an adhesive medium that bonds together and reinforces the vertical strips and the horizontal strips into a cloth core,
   wherein said screen has a mesh size having a mesh number corresponding to ¼ to ⅓ of the mesh number specified for ordinary screen printing of the ink,
   wherein, when the cloth core is pulled in a diagonal direction, the vertical and horizontal strips become inclined to each other forming a rhombic shape that reduces the tendency of the cloth layer from coming undone, and
   whereas the cloth layer in step (a) comes undone when pulled diagonally.

2. The method of manufacturing a reinforcing fiber sheet according to claim 1, further comprising:
   (d) applying a transparent synthetic resin sheet material to the cloth core.

3. The method of manufacturing a reinforcing fiber sheet according to claim 2, wherein the transparent synthetic resin sheet material is applied by screen printing with a screen that has a mesh size which permits a sufficient amount of ink to pass there-through to impregnate every fiber of the cloth layer.

4. The method of manufacturing a reinforcing fiber sheet according to any one of claims 1 to 3, further comprising repeating steps (a) and (b).

* * * * *